United States Patent [19]

Harper

[11] Patent Number: 5,701,474
[45] Date of Patent: Dec. 23, 1997

[54] CONVERTING HANDLE-BASED FIND FIRST/FIND NEXT/FIND CLOSED TO NON-HANDLE BASED FIND FIRST/FIND NEXT

[75] Inventor: James M. Harper, Colorado Springs, Colo.

[73] Assignee: Sun Microsystems, Inc., Mountain View, Calif.

[21] Appl. No.: 622,885

[22] Filed: Mar. 29, 1996

[51] Int. Cl.⁶ .................................................. G06F 17/30
[52] U.S. Cl. ........................... 395/621; 395/616; 395/601
[58] Field of Search .................................. 395/621, 616, 395/601

[56] References Cited

PUBLICATIONS

Miller, Michael J., "The Big Puetuse", PC Magazine, v14, n16 p. 108(9), Sep. 1995.
Baker Steven, "NFS on NT", v15, No. 7 p. 15, Jun. 1997.
Pietrek, Matt, "Poking Around Under the Hood: A Programmer's View of Windows NT 4.0.", Microsoft Systems Journal, v11, n8, p. 19(16), Aug. 1996.
Pietrek, Matt "Under the Hood", Microsoft System Journal, v10, n11 p. 77(5), Nov. 1995.
Trupin, Joshua, "Visual Basic 4.0 Provides Easy Entry to the Advanced Features of Windows", Microsoft System Journal, v10, n10, p. 35(17), Nov. 1995.

*Primary Examiner*—Thomas G. Black
*Assistant Examiner*—Jean M. Corriélus
*Attorney, Agent, or Firm*—William J. Kubida; Holland & Hart LLP; Homer L. Knearl

[57] ABSTRACT

Handle-based finding operations for search operations in an operating system in a computing system are converted into non-handle-based finding operations. The invention is responsive to a program module performing search operations specifying a file search path and has a find first module, a find next module and a find close module. The find first module, in response to a find first call from the program module, locates a search block for use in storing file identification information for a first file in the file search path. The find first module marks the search block as "in use," generates a handle identifying the search block and passes the handle back to the program module. The find next module is responsive to a find next call containing the handle. The find next module converts the handle into a search block address and locates the search block from the search block address. The search block is used to store the file identification information for a next file in the file search path. The find close module is responsive to a find close call with handle from the program module. The find close module converts the handle into a search block address, locates the search block from the search block address and marks the search block "not in use" to close finding operations in the operating system.

11 Claims, 5 Drawing Sheets

CONVERTING HANDLE-BASED FIND FIRST/FIND NEXT/FIND CLOSED TO NON-HANDLE BASED FIND FIRST/FIND NEXT

BACKGROUND OF THE INVENTION

1. Field of the Invention

This invention relates to finding files in a computing system. More particularly the invention relates to converting handle-based find first, find next and find close commands to conventional find first and find next operations in operating systems not using handles for these operations.

2. Description of Prior Art

In personal computing systems using operating systems such as DOS (Disk Operating System) and Windows 3.X,™ there are Find first and Find next commands. A Find first operation is called to locate a first file in response to a search command having a defined path such as "\[directory]\*.*". A Find next operation is called by the same search command to located the next file and is repeated until all files in the search have been located. A common example of a search command in DOS using Find first and Find next operations is the "dir" (directory) command. A common example of an icon-selectable search command in Windows 3.X™ operating system is the "file manager".

A problem exists in that search requests from application programs written for Windows 95™ operating system are not compatible with search requests for Windows 3.x™ operating system. Accordingly, an application program with search requests written for Windows 95™ is not downwardly compatible with Windows 3.X™. This is due to the fact that the Windows 95™ find operations are handle-based, i.e. have a handle index number identifying a search block where a filename and its metadata are temporarily stored during find operations. DOS™ and Windows 3.X™ find operations are not handle-based. Therefore, there is a need for converting the handle-based find operations into non-handle-based find operations.

SUMMARY OF THE INVENTION

In accordance with this invention, the above problem has been solved by converting the handle-based find operations into non-handle-based find operations, responsive to a finding operation specifying a file search path, in a computing system through the following computer implemented steps. A locating step in response to a find first call locates a search block for use in storing file identification information for a first file in the file search path. A marking step marks the search block as "in use" when the first file is found and the file identification for the first file is loaded into the search block. Next a handle identifying the search block in use is generated. This handle is used with a find next call. A converting step in response to the find next call converts the handle into a search block address, and an accessing step accesses the search block identified by the search block address. This search block is used to store the file identification information for a next file in the file search path. The converting and accessing steps repeating until the finding operations are closed.

As a further feature of the invention, the handle is also used with a find close call. In response to a find close call with the handle, a converting step converts the handle into a search block address. A finding step finds the search block from the search block address and marks the search block "not in use." This closes the finding operations.

The above computer implemented steps in another implementation of the invention are provided as an article of manufacture, i.e. a computer storage medium containing a computer program of instructions for performing the above described steps.

In an machine implementation of the invention apparatus converts handle-based finding operations into non-handle-based finding operations for search operations in an operating system in a computing system. The apparatus is responsive to a program module performing search operations specifying a file search path and has a find first module and a find next module. The find first module, in response to a find first call from the program module, locates a search block for use in storing file identification information for a first file in the file search path. The find first module marks the search block as "in use" when the first file is found and the file identification for the first file is loaded into the search block. The find first module also generates a handle identifying the search block in use and passes the handle back to the program module.

The find next module is responsive to a find next call containing the handle. The find next call with handle comes from the program module. The find next module converts the handle into a search block address and locates the search block from the search block address. The search block is used to store file identification information for a next file in the file search path. The find next module converts the handle and locates the search block to be used for storing file identification information until the finding operations are closed.

As a further feature of this invention, a find close module is responsive to a find close call with handle from the program module. The find close module converts the handle into a search block address. The find close module locates the search block from the search block address and marks the search block "not in use" to close finding operations in the operating system.

The great advantage and utility of the present invention is applications written for handle-based find operations in an operating system are compatible with and may be run using non-handle-based find operations in older operating systems.

The foregoing and other features, utilities and advantages of the invention will be apparent from the following more particular description of a preferred embodiment of the invention as illustrated in the accompany drawings.

DETAILED DESCRIPTION OF PREFERRED EMBODIMENTS

The embodiments of the invention described herein are implemented as logical operations in a computing system. The logical operations of the present invention are implemented (1) as a sequence of computer implemented steps running on the computing system and (2) as interconnected machine modules within the computing system. The implementation is a matter of choice dependent on the performance requirements of the computing system implementing the invention. Accordingly, the logical operations making up the embodiments of the invention described herein are referred to variously as operations, steps, or modules.

Figure 1:
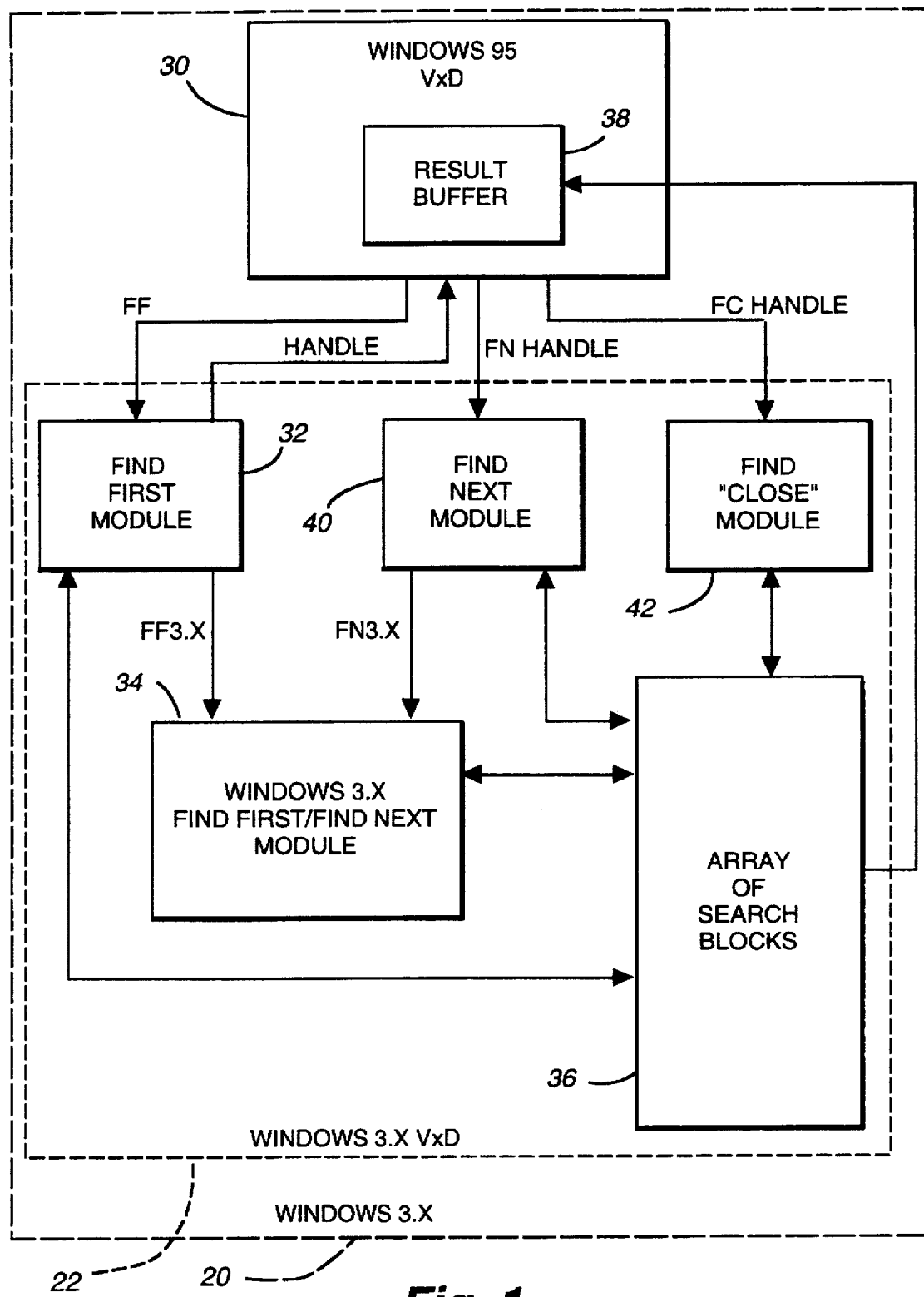
FIG. 1 shows the preferred embodiment of the invention with the find operation modules for handling handle-based find operations in a non-handle-based find operations environment.

One preferred embodiment of the invention is illustrated in FIG. 1. A program module 30 such as a VxD (virtual device driver) running in Windows 95™ issues find first (FF), find next (FN) and find close (FC) calls or commands to three separate find modules. The find first module 32 translates the find first command from the program module 30 to a find first 3.X™ command recognizable by Windows 3.X™ operating system 34. Find first module 32 also works with an array of search blocks which may be used by Windows 3.X™ operating system 34 to manage the finding of files and place the resultant file identification information in a result buffer 38.

Similarly, the find next module 40 works with Windows 3.X™ operating system 34 and the array 36. The find next module 40 converts the find next request with a handle to a find next 3.X™ request which can be processed by Windows 3.X™ to place the identification information for the next file into the result buffer 38.

Both the find next module and the find close module convert received requests with handles to 3.X requests without handles. The handle identifies one of the search blocks in the array 36. When the find first module sets up a search block in array 36, it marks it in use, and a handle identifying the search block is passed back to the program module 30. The program module then passes the find next command with the handle to find next module 60 and the find close command with the handle to the find close module 62. As will be described hereinafter, the handle is converted to a search block identifier that is used by Windows 3.X™ when placing file identification information in the search blocks and in the result buffer 38.

When a find close command is received from application 30, the find close module 42 operates to mark the search block in array 36 as closed, i.e., no longer in use.

Figure 2:
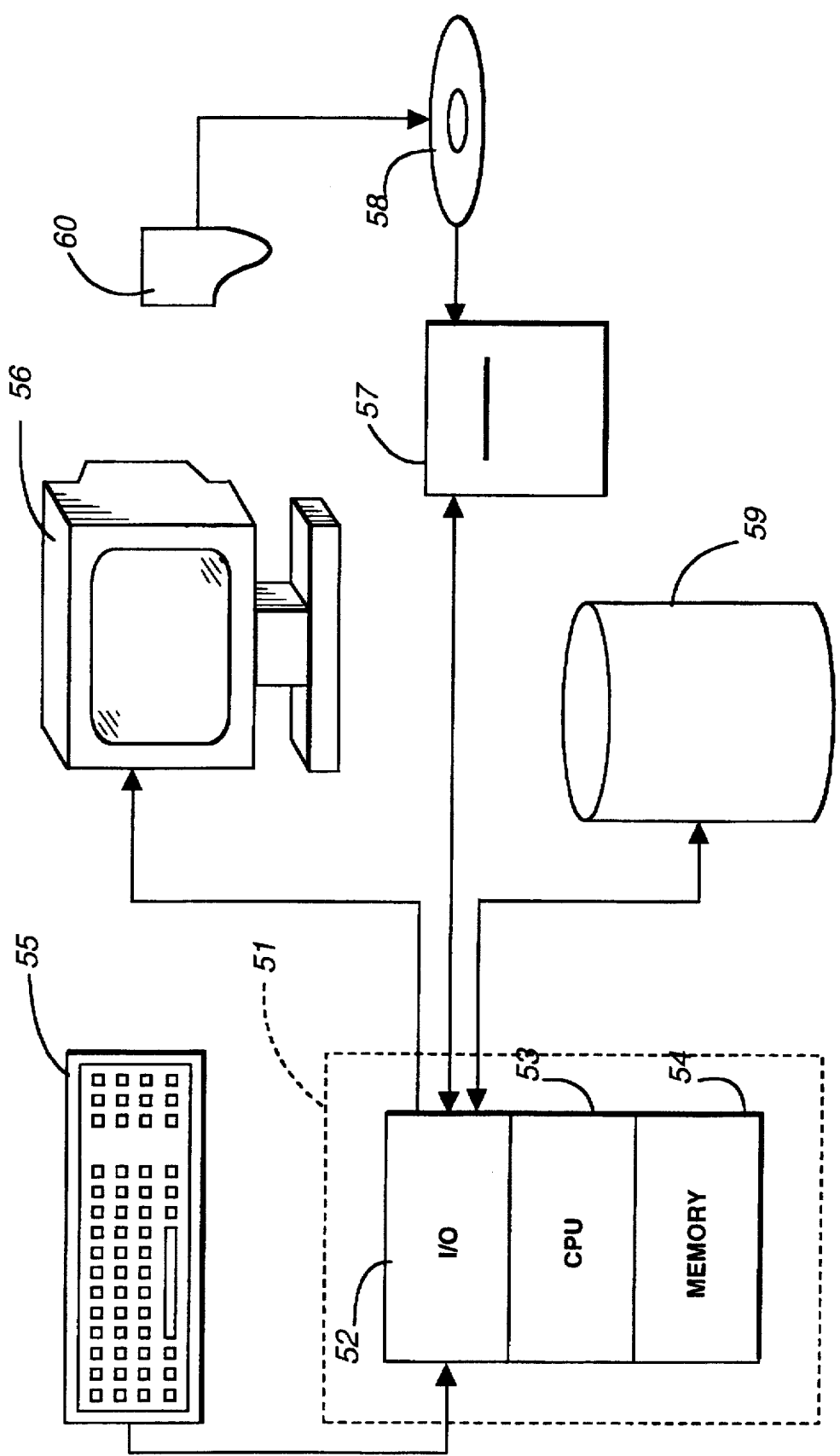
FIG. 2 illustrates a computing system to perform the computer implemented steps in accordance with the invention.

The operating environment in which the present invention is used encompasses standalone computing systems or a general distributed computing system, wherein general purpose computers, workstations, or personal computers are connected via communication links of various types, in a client-server arrangement, wherein programs and data, many in the form of objects, are made available by various members of the system. Some of the elements of a standalone computing system or a general purpose workstation computer are shown in FIG. 2, wherein a processor 51 is shown, having an input/output (I/O) section 52, a central processing unit (CPU) 53 and a memory section 54. The I/O section 52 is connected to a keyboard 55, a display unit 56, a disk storage unit 59 and a CD-ROM drive unit 57. The CD-ROM unit 57 can read a CD-ROM medium 58 which typically contains programs 60 and data. The computer program products containing mechanisms to effectuate the apparatus and methods of the present invention may reside in the memory section 54, or on a disk storage unit 59, or on the CD-ROM 58 of such a system. Examples of such systems include SPARC™ systems offered by Sun MicroSystems, Inc., personal computers offered by IBM Corporation and by other manufacturers of IBM-compatible personal computers, and systems running the UNIX™ operating system or Solaris™ operating system.

Figure 3:
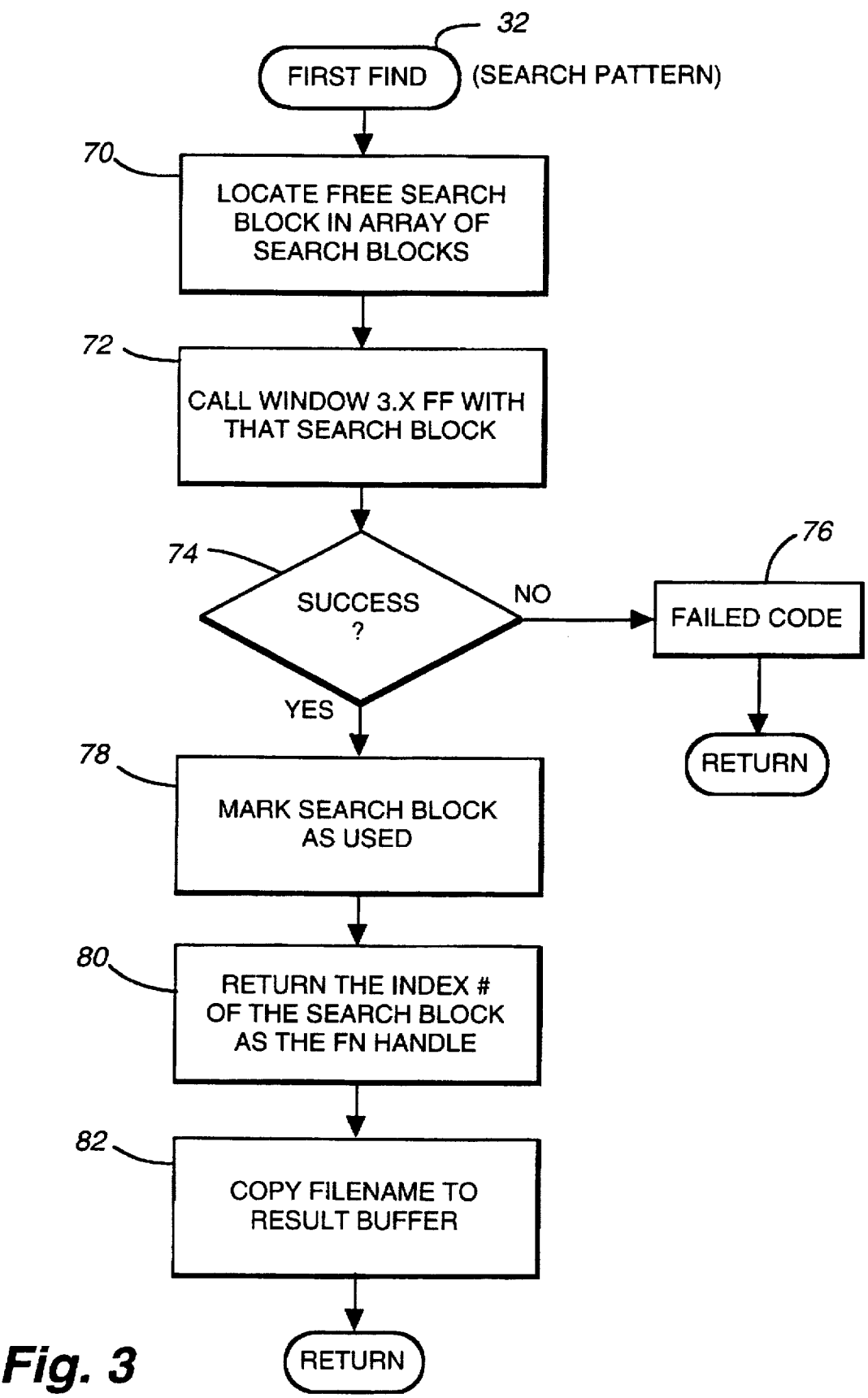
FIG. 3 shows the logical operations performed by the find first module 32 in FIG. 1.

The logical operations of the find first module 32 (FIG. 1) are illustrated in FIG. 3. When a find first command is received, the locate operation 70 locates the first free (not in use) search block in the array of search blocks 36. The find first command contains a path to the files to be found. For example, a typical path might be \docs\*.*. Such a command would be asking to find the first file in the docs directory. After the free search block is identified, module 72 notifies the Windows 3.X™ operating system find first operation FF3.X of the search block. Module 72 then loads in the search block the first file found using the search pattern path.

Decision operation 74 checks whether the FF3.X operation in step 72 was successful. If it was not successful, a failed code is returned to the application 30. If it was successful, the search block is now marked as a search block in use by operation 78.

After the search block has been loaded by module 72 and marked in use by step 78, return module 80 returns the index number of the search block in the array 36 (FIG. 1) as the handle. The handle will be used subsequently by find next module 40 and find close module 42. The find first module 32 completes its operations with step 82 copying the filename from the search block to the result buffer 38 (FIG. 1). The filename should be understood to include metadata normally associated with a filename in operating systems using the invention.

Figure 4:
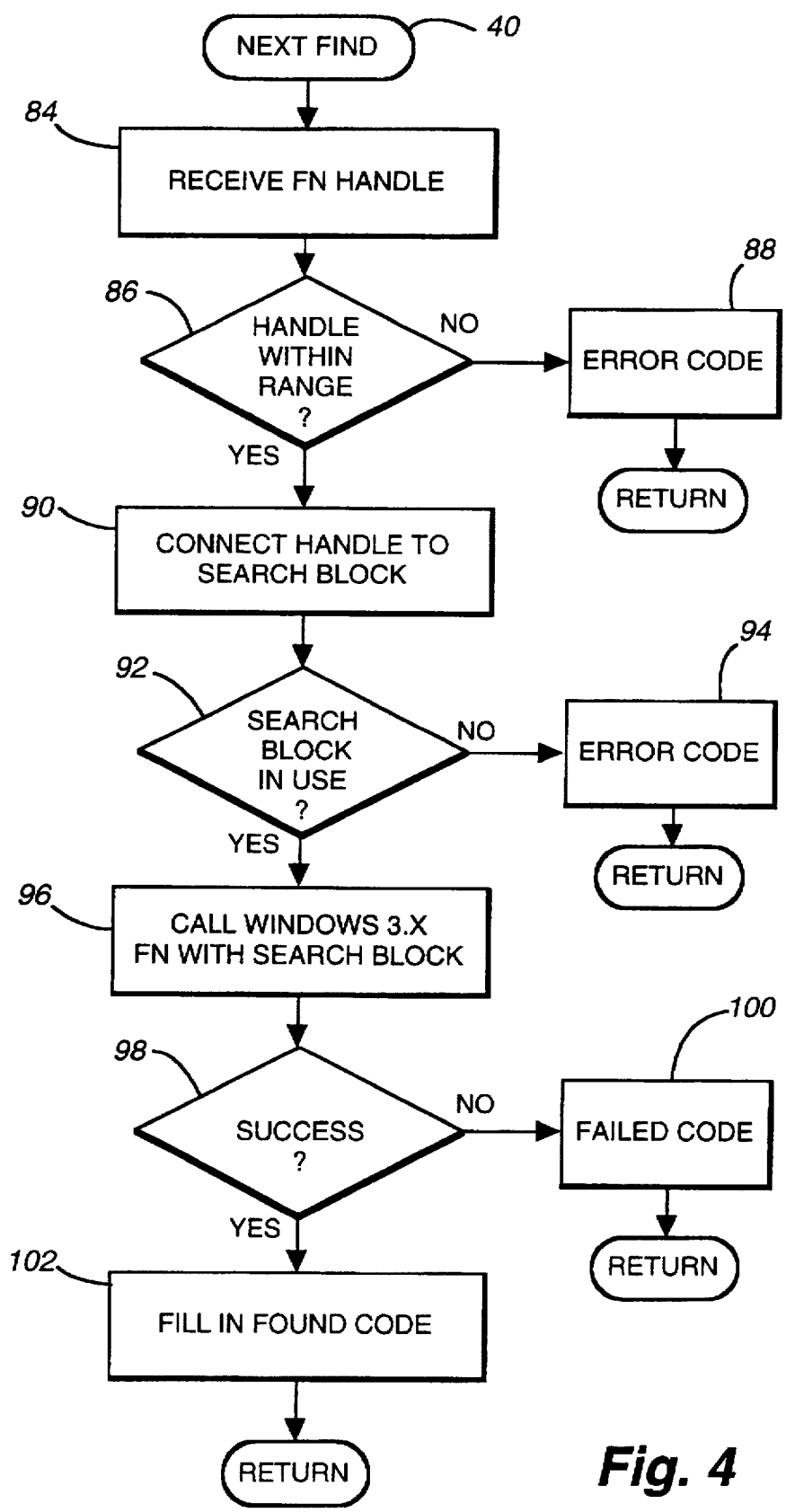
FIG. 4 shows the logical operations performed by the find next module 40 in FIG. 1.

Find next module 40 from FIG. 1 is illustrated in FIG. 4. The logical operations of the find next module begin with step 84 which receives the handle with the find next call from the device driver module 30. Decision operation 86 tests whether the handle is within range. The range is the number of search blocks in the array 36. Typically, twenty-five search blocks are used. Decision operation 86 is checking to see if the handle is within the index number range of the array. Since the index number varies from 0 to 24, the handle should be within that range. If the handle is not within range, operation flow branches no to step 88. Step 88 generates an error code after which the operation flow returns to device driver module program 30.

If the handle is within range, then the operation flow branches "yes" from decision operation 86 to convert module 90. Convert module 90 converts the handle to the search block address. Decision operation 92 then accesses the search block at the search block address and checks to see if the search block is "in use". Since the search block has a handle, it should be "in use". If decision operation 92 detects the search block is not in use, an error code is generated at step 94 and the operation flow returns to the application program.

If decision operation 92 confirms that the search block is in use, then module 96 calls the Windows 3.X™ find next operation and identifies the search block address to Windows 3.X™. Module 96 finds the next file in the search path name and places it in the search block.

Decision operation 98 checks whether the Windows FN 3.X™ operation performed by module 96 was successful. If it was not, step 100 generates a fail code and the operation flow returns to the application program. If the FN 3.X operation was successful, operation flow branches yes from decision 98 to the copy module 102. Copy module 102 copies the file name and metadata from the search block and places it in result buffer 38 (FIG. 1). The find next operation in FIG. 4 will repeat each time a find next FN command is received from the Windows 95 application.

Figure 5:
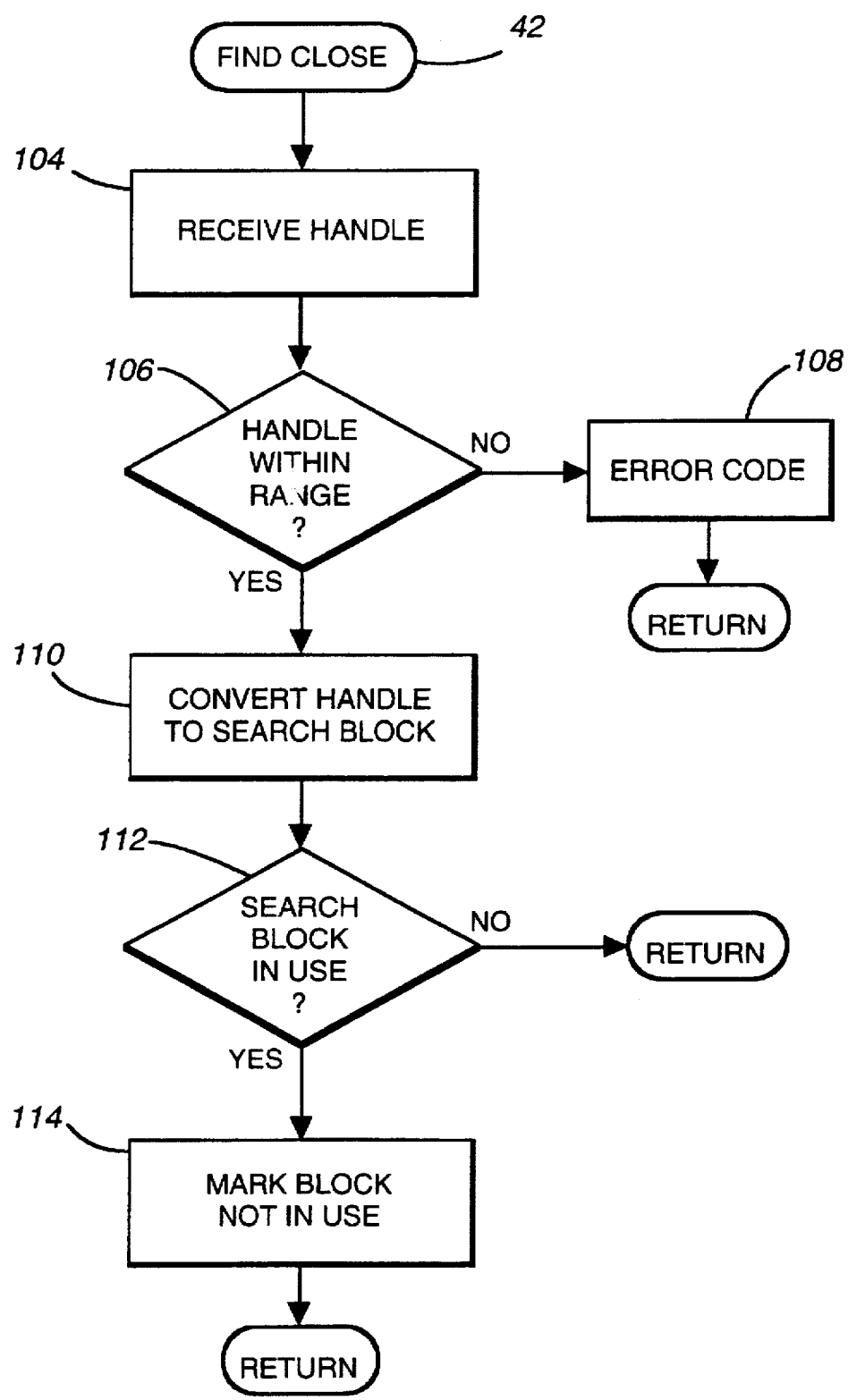
FIG. 5 shows the logical operations performed by the find close module 42 in FIG. 1.

To close out the filefinding operations, the application 30 (FIG. 1) will issue a find close command. The find close command when received is processed by the find close module 42. The logical operations performed by find close module 42 are illustrated in FIG. 5. When a find close command is received, the logical operations in FIG. 5 begin at step 104. Step 104 receives the handle with the find close call from device driver program module 30. Decision operation 106 then tests whether the handle is within range. This is the same operation as previously described for FIG. 4. If the handle is not within range, then step 108 generates an error code and the operation flow returns to the application program. If the handle is within range, step 110 converts the handle to a search block address. Decision operation 112 then finds the search block at the search block address and tests whether the search block is in use.

The expectation is that the search block is in use. Therefore, to close the find operations, the operation flow will pass to step 114 to mark the block as "not in use". After the block is marked not in use, the operation flow returns to the application program 30. If decision operation 112 detects that the block is not in use, this would simply indicate that an earlier find close operation had marked the block not in use. Operation flow branches no from decision operation 112 and returns to the application program.

While the invention has been particularly shown and described with reference to preferred embodiments thereof, it will be understood by those skilled in the art that various other changes in the form and details made by made therein without departing from the spirit and scope of the invention.

What is claimed is:

1. Apparatus for converting handle-based finding operations into non-handle-based finding operations for search operations in an operating system in a computing system, said apparatus responsive to a search operation specifying a file search path and comprising:

a find first module responsive to a find first call from a program module, said find first module locating a search block for use in storing file identification information for a first file in the file search path and marking the search block as "in use" when the first file is found and the file identification for the first file is loaded into the search block;

said find first module generating a handle identifying the search block in use;

a find next module responsive to the handle and responsive to a find next call from the program module, said find next module converting the handle into a search block address; and said find next module locating the search block from the search block address and using the search block to store the file identification information for a next file in the file search path and said find next module converting the handle and locating the search block until the finding operations are closed.

2. The apparatus of claim 1 and in addition:

a find close module responsive to the handle and responsive to a find close call from the program module, said find close module converting the handle into a search block address; and said find close module locating the search block from the search block address and marking the search block "not in use."

3. The apparatus of claim 2 wherein the handle is a handle value and said find next module further comprises:

a test module testing whether the handle is within an acceptable range of values for the handle and whether the in-use search block is actually in use.

4. The apparatus of claim 1 wherein said find first module comprises:

a locate module for locating a free search block in an array of search blocks, a free search block being a search block marked "not in use";

a converting/loading module converting a handled-based find first call from the program module into a non-handle-based find first call to the operating system to find and load the first file in the search path into the free search block;

a marker module for marking the free search block "in use" after the first file identification is loaded into the free search block whereby the free search block becomes an in-use search block; and return module generating a handle identifying the in-use search block for the finding operation.

5. The apparatus of claim 4 wherein said find next module comprises:

a test module testing whether the handle is within an acceptable range of values for the handle and whether the in-use search block is actually in use;

a second converting/loading module converting a handled-based find next command from the program module into a non-handle-based find next call to the operating system to find and load the next file in the search path into the in-use search block.

6. A method for converting handle-based finding operations into non-handle-based finding operations in an operating system in a computing system, said method responsive to a finding operation specifying a file search path and comprising the computer implemented steps of:

in response to a find first call, locating a search block for use in storing file identification information for a first file in the file search path;

marking the search block as "in use" when the first file is found and the file identification for the first file is loaded into the search block;

generating a handle identifying the search block in use;

in response to a find next module call with the handle, converting the handle into a search block address; and accessing the search block identified by the search block address and using the search block to store the file identification information for a next file in the file search path; and said converting and accessing steps repeating until the finding operations are closed.

7. The method of claim 6 and in addition:

in response to a find close call with the handle, converting the handle into a search block address; and finding the search block from the search block address and marking the search block "not in use."

8. The method of claim 6 further comprises the computer implemented steps of:

finding each file in the search path; and loading each file found into the search block when the file is found.

9. A computer program storage medium readable by a computing system and encoding a computer program of instructions for executing a computer process for converting handle-based finding operations into non-handle-based finding operations in an operating system in a computing system, said computer process responsive to a finding operation specifying a file search path and comprising the steps of:

in response to a find first call, locating a search block for use in storing file identification information for a first file in the file search path;

marking the search block as "in use" when the first file is found and the file identification for the first file is loaded into the search block;

generating a handle identifying the search block in use;

in response to a find next module call with the handle, converting the handle into a search block address; and accessing the search block identified by the search block address and using the search block to store the file identification information for a next file in the file search path; and said converting and accessing steps repeating until the finding operations are closed.

10. The computer program storage medium of claim 9 where said computer process in the computer program further comprises the steps of:

in response to a find close call with the handle, converting the handle into a search block address; and finding the search block from the search block address and marking the search block "not in use."

11. The computer program storage medium of claim 9 where said computer process in the computer program further comprises the steps of:

finding a file in the search path; and loading the file found into the search block when the file is found.

* * * * *